Nov. 22, 1966 L. J. JULIEN 3,286,858
CANE PLANTER
Filed Nov. 19, 1964 3 Sheets-Sheet 1
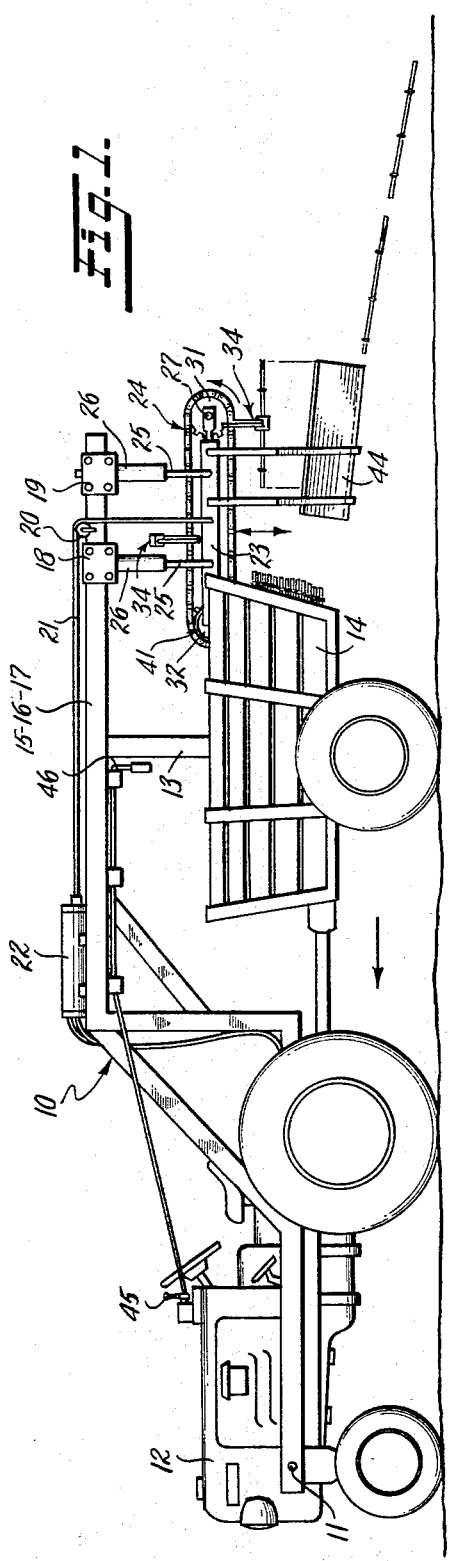
Fig. 1.
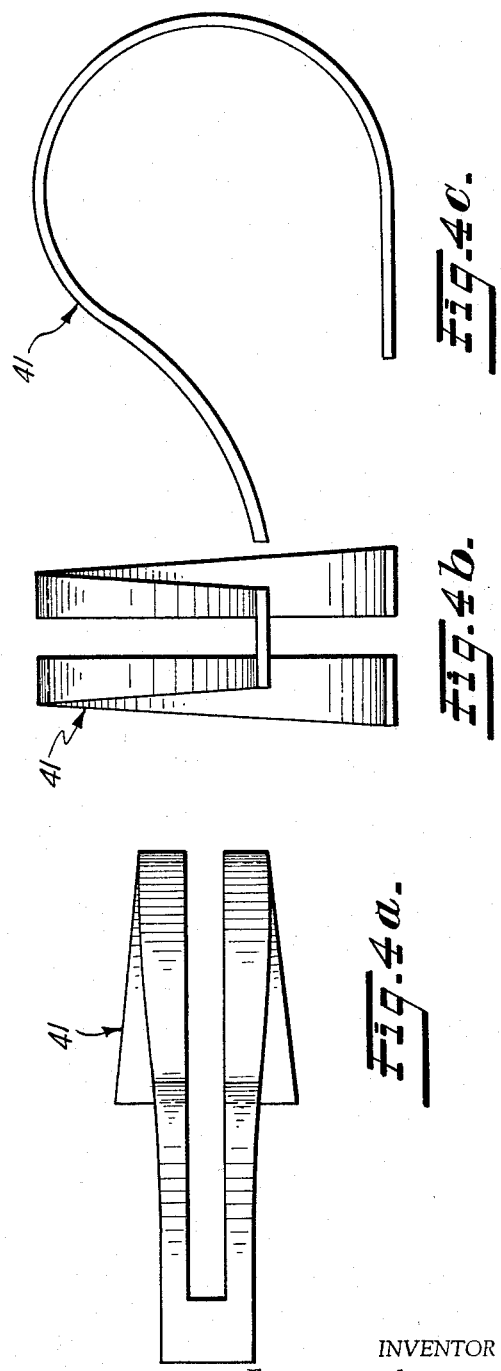
Fig. 4c.
Fig. 4b.
Fig. 4a.
INVENTOR
Leonard J. Julien
BY *Holcombe, Wetherill & Brisebois*
ATTORNEYS Nov. 22, 1966  L. J. JULIEN  3,286,858
CANE PLANTER
Filed Nov. 19, 1964  3 Sheets-Sheet 2
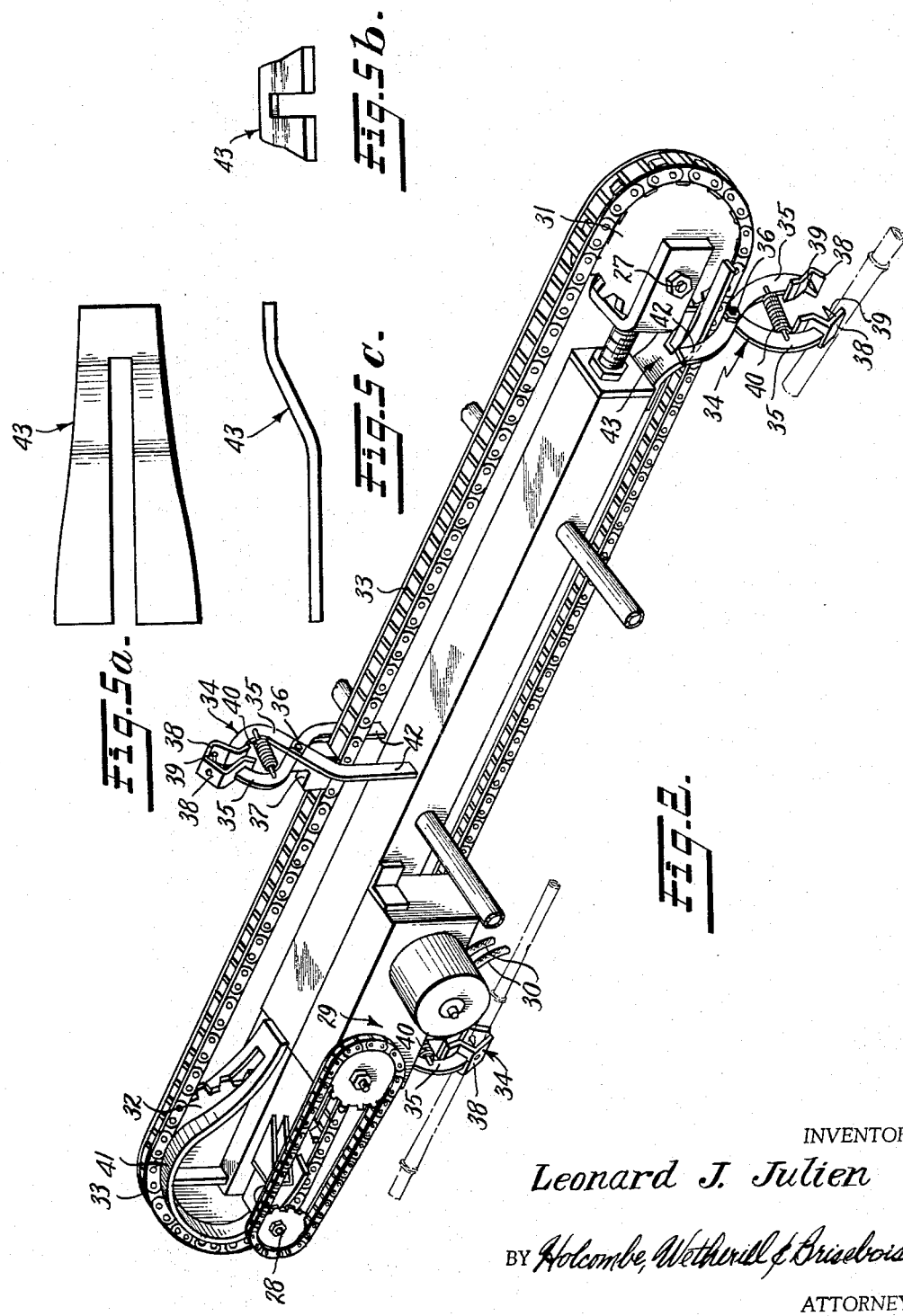
INVENTOR
Leonard J. Julien
BY Holcombe, Wetherill & Brisebois
ATTORNEYS Nov. 22, 1966 — L. J. JULIEN — 3,286,858
CANE PLANTER
Filed Nov. 19, 1964 — 3 Sheets-Sheet 3

INVENTOR
Leonard J. Julien
BY
Holcombe, Wetherill & Brisbois
ATTORNEYS

United States Patent Office 3,286,858
Patented Nov. 22, 1966

3,286,858
CANE PLANTER
Leonard J. Julien, Rte. 1, Box 173, Donaldsonville, La.
Filed Nov. 19, 1964, Ser. No. 412,361
10 Claims. (Cl. 214—83.26)

This invention relates to a device for planting sugar cane. Such planting is carried out by laying stalks of cane, some six to eight feet long, in a furrow, and this has heretofore been done by hand, since there is no known machinery for picking up the stalks, which are irregular in length and thickness, and depositing them, properly oriented, in the furrow.

My device comprises a plurality of parallel overhead conveyors positioned above a cane cart. Each conveyor comprises an endless chain which carries a plurality of grabs for gripping cane. These chains are continuously driven along a path above the bottom of the cart and means are provided for periodically opening the grabs so that they may receive a stalk, closing then to carry the stalk past the rear of the cart, and then reopening the grabs to release the stalk and drop it in the furrow.

The conveyors are so mounted that they may be progressively lowered, preferably as a unit, as the supply of cane in the cart is used up, and means are also provided for ensuring that cane picked up by conveyors positioned toward the sides of the cart will nevertheless be deposited in the center of the furrow.

A preferred embodiment of my invention is illustrated in the accompanying drawings, in which:

FIG. 1 is a diagrammatic side view showing my cane planter in operation;

FIG. 2 is a perspective view showing one of the conveyors;

Figure 3:
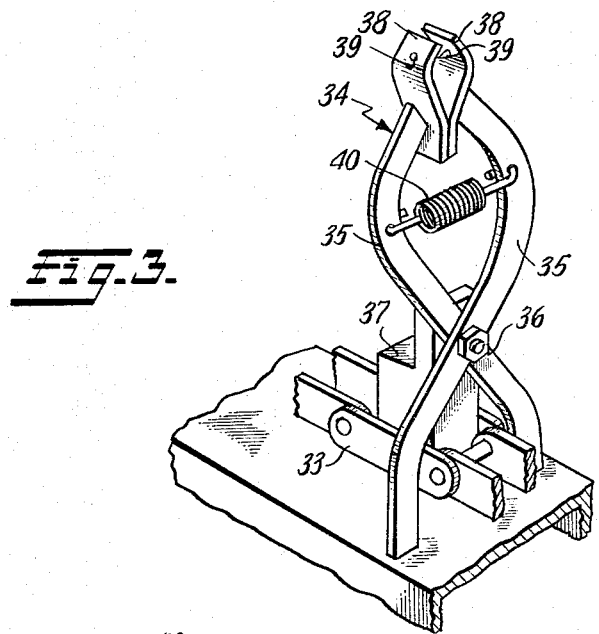
FIG. 3 is a perspective view showing one of the grabs carried by the conveyors.
Figure 6:
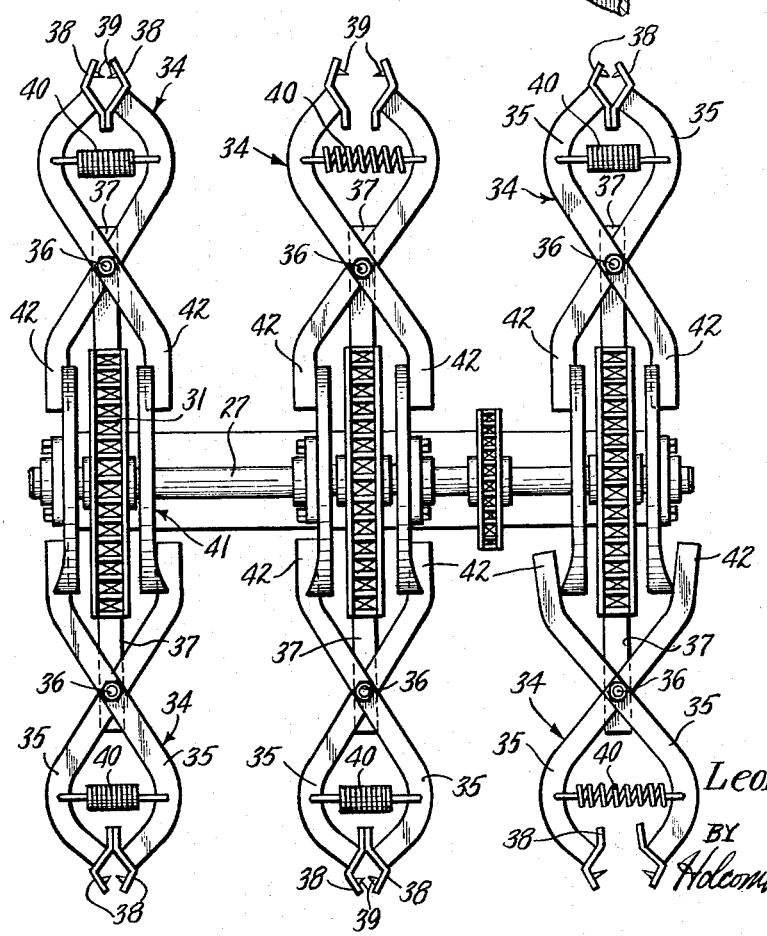

FIGS. 4a, 4b, and 4c are plan, end, and side views, respectively, showing the grab expander at the cane releasing end of each conveyor;

FIGS. 5a, 5b and 5c are plan, end and side views, respectively, showing the grab expander at the pick-up end of each conveyor; and FIG. 6 is a rear end view of my machine.

Like reference numerals denote like parts throughout the several views.

Turning now to FIG. 1, it will be seen that a frame 10 is pivotally connected at 11 to a conventional tractor 12. This frame is also supported by bars 13 fixed to a cane cart 14 about 8 feet long—approximately the length of the average cane. The frame comprises three longitudinal beams, 15, 16, and 17. Each of the side beams 15, 16, is directly connected to one of the bars 13, and all three of these longitudinal beams are connected together by cross-beams 18, 19. The center beam 17 carries a pulley wheel 20, over which a cable 21 passes. This cable is attached at one end to power means, which may be a hydraulic cylinder 22, controlled from the tractor, and at the other to a sub-frame 23 which carries the three conveyor chains 24. Upright guide rods 25 fixed to the sub-frame 23 slide telescopically in tubes 26 fixed to the main frame 10, so that the sub-frame is kept level as it is moved up and down by the cable 21. The sub-frame carries near one end the stationary shaft 27 and near the other the driven shaft 28. The driven shaft 28 is driven by a hydraulic turbine drive unit 29 mounted on the sub-frame and supplied through hoses 30 from the hydraulic power system of the tractor. Each of the shafts 27, 28 carries three sprocket wheels. The sprocket wheels 31 on the stationary shaft 27 are idlers, while those 32 on the driven shaft 28 turn with the shaft on which they are carried. A suitable chain 33 is stretched between each idler and the associated driven sprocket wheel, and each chain carries a plurality of grabs 34, preferably three. Each grab comprises a pair of arms 35 pivotally mounted on a pivot pin 36 fixed to a mounting block 37 welded to the chain 33. The arms terminate at their outer ends in curved fingers 38 provided with inner spikes 39. A spring 40 so biases the arms as to urge the fingers 38 to a closed position.

The sub-frame carries near each driven sprocket wheel, at the pick-up end of the machine, a grab expander 41, which acts on the ends 42 of the arms 35 to spread the fingers 38 as the grab passes over the driven sprocket wheel. At this point the fingers embrace a stalk of sugar cane, said stalks being positioned longitudinally of the cart. As the grab passes beyond the expander, the fingers are brought together by the spring 40, and the stalk of cane is carried past the back of the cart. The grab then encounters the expander 43 near the idler sprocket, which acts in like manner on the ends 42 of the arms 35, thus opening the fingers and releasing the stalk of cane, which falls onto the guide plates 44, which define an inclined V-shaped trough, through which the cane drops into the furrow.

The grabs on the individual conveyor chains are spaced apart by a distance of about 8 feet, slightly longer than the length of a stalk of cane, so that no stalk will be gripped by two grabs at the same time. Moreover, the grabs on each conveyor chain are spaced from those on the other chains, longitudinally of the vehicle, so that the three conveyors operate to feed stalks successively or in continuous overlap, rather than simultaneously.

As the supply of cane in the cart is depleted, the sub-frame is lowered so that the grabs continue to encounter cane as they travel through the cart. This is accomplished by means of the lever 45 which controls the power means controlling the cable 21. If it is preferred to have this lever operated by a man stationed on the cart rather than the tractor driver, a cord 46 may be rigged for this purpose.

It will of course be appreciated that I have herein described only a single representative embodiment of my invention, which may be modified as to detail without thereby departing from the essential features thereof, which are defined by the following claims.

What is claimed is:

1. Cane planting machinery for cooperation with an open-topped vehicle, said machinery comprising a portably mounted main frame, an elongated sub-frame suspended from said main frame, means for connecting said main frame to said vehicle in a position in which at least one end of said sub-frame is suspended over said vehicle and is constrained to travel therewith, means for raising and lowering said sub-frame relative to said main frame, at least one flexible endless carrier means mounted on said sub-frame to travel in a predetermined path relative thereto, means for driving said endless carrier means, grab means carried by and spaced longitudinally along said endless carrier means, said grab means being adapted to open and close in a direction transverse to said predetermined path, means biasing said grab means to its closed position, expander means on said sub-frame positioned to temporarily open said grab means at a cane pick-up point near one end of said sub-frame and at a cane release point near the other end of said sub-frame, and upwardly open trough means positioned beneath said release point to receive cane released by said grab means and guided into a predetermined position relative to the path of travel of said vehicle.

2. Cane planting machinery as claimed in claim 1 comprising telescoping means connecting said main frame and sub-frame to guide said sub-frame as it is raised and lowered.

3. Cane planting machinery as claimed in claim 1 in which said sub-frame is adapted to be mounted above a wagon with one end of said sub-frame projecting beyond the rear end of said wagon, and the longitudinal bisector of the trough means lies in the same vertical plane as the longitudinal bisector of the sub-frame, the end of said trough means remote from said wagon being lower than the end nearest said wagon.

4. Cane planting machinery as claimed in claim 1 in which each grab means comprises a pair of arms extending generally outward away from said carrier means and pivotally connected to each other intermediate their ends, said biassing means consisting of a spring urging the outer ends of said arms together, and said expander means comprising cam surfaces positioned to enter between the inner ends of said arms and drive them progressively apart, thus likewise separating said outer ends, as said grab means passes by said expander means.

5. Cane planting machinery a claimed in claim 4 comprising spikes carried by the outer ends of said grab means to engage the cane.

6. Cane planting machinery as claimed in claim 1 comprising a plurality of parallel endless carrier means carried by said sub-frame, and separate expander means for each carrier means.

7. Cane planting machinery as claimed in claim 6 in which the grab means on each carrier means are spaced by a distance at least as great as the length of the cane to be planted, and the grab means on adjacent carrier means are longitudinally staggered relative to each other.

8. Cane planting means as claimed in claim 6 in which said sub-frame is adapted to be mounted above a wagon with one end of said sub-frame projecting beyond the rear end of said wagon, and said trough means extends laterally beneath all of said endless carrier means, and defines a guide for directing cane delivered by any of said endless carrier means into a single line.

9. Cane planting machinery as claimed in claim 1 in which said means for driving said endless carrier means comprises a power source independent of the wheels of said open-topped vehicle.

10. Cane planting machinery as claimed in claim 9 comprising vehicular means which is independent of said open-topped vehicle and at least partially supports said main frame and in which said power source is mounted on and drives said independent vehicular means.

References Cited by the Examiner
UNITED STATES PATENTS

| | | |
|---|---|---|
| 2,213,774 | 9/1940 | Taylor. |
| 2,411,348 | 11/1946 | Turner. |
| 2,705,659 | 4/1955 | Barchoff _____ 294—118 |

GERALD M. FORLENZA, *Primary Examiner.*

ALBERT J. MAKAY, *Examiner.*